United States Patent
Woolsey et al.

(10) Patent No.: US 12,514,270 B2
(45) Date of Patent: Jan. 6, 2026

(54) METHODS AND COMPOSITIONS FOR REDUCING THE HEATING TIME OF AN EGG PATTY

(71) Applicant: THE HILLSHIRE BRANDS COMPANY, Chicago, IL (US)

(72) Inventors: Lloyd Woolsey, Oswego, IL (US); Marie Jirsa, Downers Grove, IL (US)

(73) Assignee: THE HILLSHIRE BRANDS COMPANY, Chicago, IL (US)

( * ) Notice: Subject to any disclaimer, the term of this patent is extended or adjusted under 35 U.S.C. 154(b) by 484 days.

(21) Appl. No.: 17/514,044

(22) Filed: Oct. 29, 2021

(65) Prior Publication Data
US 2022/0046963 A1    Feb. 17, 2022

Related U.S. Application Data

(63) Continuation of application No. 13/692,380, filed on Dec. 3, 2012, now abandoned.

(60) Provisional application No. 61/601,285, filed on Feb. 21, 2012.

(51) Int. Cl.
  *A23L 15/00*    (2016.01)
  *A23L 5/10*    (2016.01)

(52) U.S. Cl.
  CPC ............. *A23L 15/30* (2016.08); *A23L 5/15* (2016.08)

(58) Field of Classification Search
  CPC .................................. A23L 15/30; A23L 5/15
  See application file for complete search history.

(56) References Cited

U.S. PATENT DOCUMENTS

| | | | |
|---|---|---|---|
| 3,061,442 A | 10/1962 | Ward et al. | |
| 3,395,024 A | 7/1968 | Earle | |
| 3,830,945 A | 8/1974 | Scharfman | |
| 4,409,249 A | 10/1983 | Forkner | |
| 5,932,276 A | 8/1999 | Bhatia et al. | |
| 2003/0224098 A1 | 12/2003 | Mathews | |
| 2006/0121160 A1 | 6/2006 | Preppernau et al. | |
| 2009/0246334 A1* | 10/2009 | Efstathiou ............ | A23B 5/043 426/565 |

FOREIGN PATENT DOCUMENTS

| | | |
|---|---|---|
| EP | 0497553 A1 | 8/1992 |
| EP | 1795075 A1 | 6/2007 |
| JP | 55074765 A  * | 6/1980 |
| JP | 2002281915 A  * | 10/2002 |
| JP | 2003135020 A | 5/2003 |

OTHER PUBLICATIONS

Machine Translation of Kikuchi et al, JP 2002281915 (Oct. 2002) (Year: 2002).*
Machine Translation of Hara et al, JP-55074765 (Jun. 1980) (Year: 1980).*

* cited by examiner

*Primary Examiner* — Emily M Le
*Assistant Examiner* — Tynesha L McClain

(57) ABSTRACT

A method for reducing the heating time of an egg patty includes adding an effective amount of a calcium additive to the egg patty, where the calcium additive reduces the microwave heating time required to achieve a target temperature as compared to an egg patty in which the calcium additive is not present.

20 Claims, 4 Drawing Sheets

METHODS AND COMPOSITIONS FOR REDUCING THE HEATING TIME OF AN EGG PATTY

CROSS-REFERENCE TO RELATED APPLICATION

This application is a continuation of U.S. Non-Provisional patent application Ser. No. 13/692,380 entitled "METHODS AND COMPOSITIONS FOR REDUCING THE HEATING TIME OF AN EGG PATTY" filed on Dec. 3, 2012, now abandoned, which claims the benefit of U.S. Provisional Patent Application Ser. No. 61/601,285, filed on Feb. 21, 2012, which are incorporated herein by reference in their entirety.

TECHNICAL FIELD

The present technology relates generally to the field of egg products. Specifically, the technology relates to methods and compositions for reducing the microwave heating time of an egg patty.

BACKGROUND

Microwavable breakfast sandwiches present a technical problem wherein the optimal heating times for individual components can differ substantially. For example, the heating time required for the egg patty component of a frozen sandwich is substantially longer than that required for the bread component. Often, the bread component becomes unpalatable when subjected to the same heating time required for the egg patty. To avoid this effect, many manufactures instruct consumers to heat the sandwich components separately and then assemble them into the finished product.

SUMMARY

The methods and compositions provided herein allow single-step microwave heating of a frozen egg patty sandwich without over-heating the bread component by reducing the required heating time of the egg patty.

In one aspect, a method is provided for reducing the heating time of an egg patty including adding an effective amount of a calcium additive to the egg patty, wherein the calcium additive reduces the microwave heating time required to achieve a target temperature as compared to an egg patty in which the calcium additive is not present. In some embodiments, the target temperature is the average temperature of the egg patty. In some embodiments, the average temperature of the egg patty is from about 48° C. to about 88° C. In some embodiments, the average temperature of the egg patty is from about 66° C. to about 71° C. In some embodiments, the average temperature of the egg patty is at least 71° C.

In some embodiments, the calcium additive includes calcium chloride, calcium caseinate, calcium carbonate, calcium citrate, calcium phosphates, calcium lactate, calcium gluconate, calcium lactate gluconate, dehydrated whey, or a fraction or mixture of any two or more such calcium additives. In some embodiments, the calcium additive is present from about 0.02 wt % to about 0.15 wt %. In some embodiments, the calcium additive is present at about 0.1 wt %. In some embodiments, the calcium additive is calcium chloride. In other embodiments, the calcium chloride includes anhydrous calcium chloride. In yet other embodiments, the calcium additive is a dehydrated whey. In some embodiments, the heating time required to reach the target temperature is from about 60 seconds to about 120 seconds.

In another aspect, a composition is provided including whole eggs, egg white, egg yolks, or a fraction or mixture of any two or more thereof; and a calcium additive; wherein: the composition is an egg patty; and the composition exhibits a reduced microwave heating time required to achieve a target temperature, as compared to an egg patty in which the calcium additive is not present.

In some embodiments, the composition is a pre-cooked egg patty. In some embodiments, the calcium additive comprises calcium chloride, calcium caseinate, calcium carbonate, calcium citrate, calcium phosphates, calcium lactate, calcium gluconate, calcium lactate gluconate, or dehydrated whey. In some embodiments, the calcium additive consists of calcium chloride.

In another aspect, a comestible is provided including a composition including whole eggs, egg white, egg yolks, or a fraction thereof or a mixture of any two or more thereof; and a calcium additive; wherein: the composition is an egg patty; and the composition exhibits a reduced microwave heating time required to achieve a target temperature, as compared to an egg patty in which the calcium additive is not present, and optionally one or more meat products. In some embodiments, the comestible is a sandwich of the bread product and the composition.

DETAILED DESCRIPTION

Definitions

Figure 1:
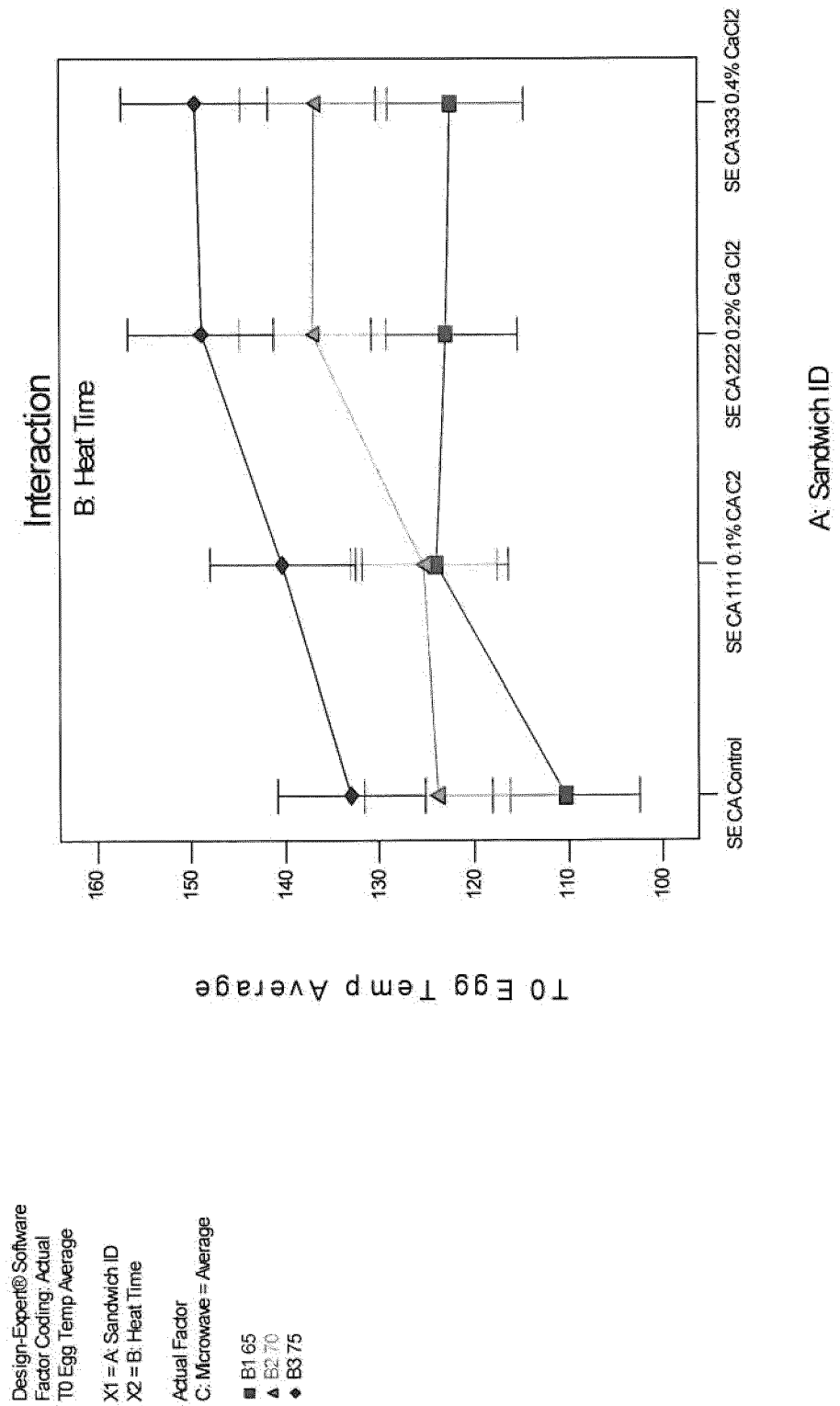
FIG. 1 is a chart showing the effect of 0.1, 0.2, and 0.4 wt % CaCb on the average temperature of an egg patty microwave heated for 65 (square), 70 (triangle), or 75 (diamond) seconds at time 0, according to the examples. Time ○ is 90 seconds after microwave heating is completed.

The definition of certain terms used herein are provided below. Unless defined otherwise, all technical and scientific terms used herein have the same meaning as commonly understood by one of ordinary skill in the art to which the present disclosure pertains.

As used herein, the singular forms "a," "an," and "the" include plural referents unless the context clearly indicates otherwise. For example, reference to "an egg patty" or "the egg patty" includes a combination of two or more egg patties, and the like.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "egg patty" refers to an edible egg product prepared as a pre-determined three-dimensional shape for consumption alone or as a component of a multi-component product such as, for example, a sandwich. The patty may be of any shape, such as but not limited to a circle, an oval, a square, a rectangle, a star, a crescent, or any shape related to or derived from these shapes. The patty may be of any thickness compatible with the intended mode of consumption, such as, for example, from 0.25 to 1.0 inch thick. The optimal dimensions of the egg patty will depend on the intended mode of consumption. For example, a patty intended to be consumed as sandwich component may optimally be of a lesser thickness than a patty intended to be consumed alone. In some embodiments, the egg patty is pre-cooked. In some embodiments, the egg patty is a component of a sandwich including one or more bread and/or meat products.

As used herein, "target temperature" refers to the desired final temperature of a microwave-heated egg patty. In some embodiments, the target temperature is the maximum temperature of the egg patty. In some embodiments, the target temperature is the minimum temperature of the egg patty. In some embodiments, the target temperature is the average temperature of the egg patty. In some embodiments, the target temperature of an egg patty depends on the intended mode of consumption and other ingredients present in the egg patty.

As used herein, "heating time" refers to the microwaving time required to achieve an egg patty target temperature. Heating time will vary depending on the target temperature and the starting temperature of the egg patty, the dimensions of the egg patty, and the context in which the egg patty is heated (e.g. alone or as a multi-component product). Heating time will also vary depending on the power and settings of the microwave in use. In some embodiments the heating time required to achieve a target temperature is from about 60 seconds to about 120 seconds. In some such embodiments, the heating time is from about 60 seconds to about 75 seconds. Either of these ranges may include, where the heating time is about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, or about 120 seconds.

As used herein, "calcium additive" refers to any edible substance containing calcium, the inclusion of which is compatible with the preparation and consumption of an egg patty. Calcium additives include, but are not limited to, calcium chloride, calcium caseinate, calcium carbonate, calcium citrate, calcium phosphates, calcium lactate, calcium gluconate, calcium lactate gluconate, dehydrated whey, and a mixture of any two or more thereof. In some embodiments, the calcium additive is calcium chloride. In some embodiments, the calcium additive is anhydrous calcium chloride. In some embodiments, anhydrous calcium is present from about 0.02 wt % to about 0.15 wt % of the egg patty. In one preferred embodiment, the calcium additive is dehydrated whey.

As used herein, "dehydrated whey" refers to dairy milk serum (aka whey) from which the water content has been evaporated. Milk serum refers to the liquid remaining after milk has been curdled and strained, and is a by-product of the manufacture of cheese.

As used herein, an "effective amount" of a calcium additive refers to the amount required to reduce the microwave heating time required to achieve the desired target temperature of an egg patty containing the additive compared to an egg patty lacking the additive. What constitutes an effective amount of a particular calcium additive will depend on the desired target temperature and the characteristics of the calcium additive in question. For example, what constitutes an effective amount of a calcium additive having a proportionally higher calcium content may be less than what constitutes an effective amount of a calcium additive having a proportionally lower calcium content. In some embodiments, an effective amount of a calcium additive is from about 0.02 wt % to about 0.15 wt % of the egg patty. In one embodiment, the effective amount of the calcium additive is 0.03 wt % of the egg patty. In another embodiment, the effective amount of the calcium additive is 0.05 wt % of the egg patty. In another embodiment, the effective amount of the calcium additive is 0.1 wt % of the egg patty. Thus, where the calcium additive includes calcium chloride, calcium caseinate, calcium carbonate, calcium citrate, calcium phosphates, calcium lactate, calcium gluconate, or calcium lactate gluconate, the additive may be present from 0.02 wt % to about 0.15 wt %. This range may include one or more of the following as well where the additive is present from about 0.03 wt %, at about 0.05 wt %, or at about 0.1 wt %. In one embodiment, where the calcium additive is calcium chloride, the calcium chloride is present at about 0.03 wt %, at about 0.05 wt %, or at about 0.1 wt %.

Where the calcium additive is derived from dehydrated whey, it is the calcium content of the dehydrated whey upon which the effective amount of the calcium additive is determined. For example dehydrated whey typically has from about 22.5 wt % to about 27.5 wt % of calcium. Thus, where the egg patty contains dehydrated whey as the calcium additive, the dehydrated whey is present in the egg patty at from about 0.13 wt % to about 0.64 wt %. However, the egg patty contains from about 0.03 wt % to about 0.15 wt % of added calcium.

Methods

In one aspect, a method is provided for reducing the heating time of an egg patty including adding an effective amount of a calcium additive to the egg patty, wherein the calcium additive reduces the microwave heating time required to achieve a target temperature compared to an egg patty in which the calcium additive is not present. Thus, the calcium additive reduces the microwave heating time of the egg patty without negatively impacting the taste and texture of the egg patty.

As discussed above, the target temperature may be a maximum temperature of the egg patty. For fully heating an egg patty the maximum temperature of the egg patty is typically greater than about 47° C. For example, the maximum temperature may be about 48° C. This may include where the maximum temperature may be about 51° C., about 54° C., about 57° C., about 60° C., about 63° C., about 66° C., about 69° C., or about 71° C. In some embodiments, the maximum temperature of the egg patty is above 48° C., above 51° C., above 54° C., above 57° C., above 60° C., above 63° C., above 66° C., above 69° C., or above 71° C. In some embodiments, the maximum temperature of the egg patty is at least 71° C.

Also as noted above, the target temperature may be a minimum temperature of the egg patty. For example, the minimum temperature may that which is sufficient to warm the egg patty for consumption. In some embodiments, the minimum temperature of the egg patty is from about 48° C. to about 71° C., or higher. This may include individual temperatures of about 51° C., about 54° C., about 57° C., about 60° C., about 63° C., about 66° C., about 69° C., or about 71° C. In some embodiments, the minimum temperature of the egg patty is above 48° C., above 51° C., above 54° C., above 57° C., above 60° C., above 63° C., above 66° C., above 69° C., or above 71° C. In some embodiments, the minimum temperature of the egg patty is at least 71° C.

As further noted above, the target temperature may be the average temperature of the egg patty. In some embodiments, the average temperature of the egg patty is from about 48° C. to about 71° C., or higher. This may include individual temperatures of about 51° C., about 54° C., about 57° C., about 60° C., about 63° C., about 66° C., about 69° C., or about 71° C. In some embodiments, the average temperature of the egg patty is above 48° C., above 51° C., above 54° C., above 57° C., above 60° C., above 63° C., above 66° C., above 69° C., or above 71° C. In some embodiments, the average temperature of the egg patty is from about 48° C. to about 88° C. In some embodiments, the average temperature of the egg patty is from about 66° C. to about 71° C. In some embodiments, the average temperature of the egg patty is at least 71° C.

The microwave heating time required to achieve the target temperature will vary depending on the desired target temperature and the starting temperature of the egg patty, as well as the dimensions of the egg patty. Heating time will also vary depending on the power and settings of the microwave in use. A suitable heating time can be determined empirically by microwaving egg patties for varying periods of time and measuring the temperatures achieved. Methods for measuring the temperature of egg patties are known in the art, including but not limited to the use of a temperature probe inserted into various regions of the egg patties.

The microwave heating time required to achieve the target temperature will vary depending on the different components used to make the sandwich. Different bread types heat differently, different meats heat differently.

The heating time required to achieve a target temperature is from about 60 seconds to about 120 seconds. In some embodiments, the heating time is from about 60 seconds to about 75 seconds. This includes, heating times of about 60, about 65, about 70, about 75, about 80, about 85, about 90, about 95, about 100, about 105, about 110, about 115, or about 120 seconds.

Calcium additives may include any edible substance containing calcium, the inclusion of which is compatible with the preparation and consumption of an egg patty, without negatively impacting the taste or texture of the egg patty. Calcium additives may include, but are not limited to, calcium chloride, calcium caseinate, calcium carbonate, calcium citrate, calcium phosphates, calcium lactate, calcium gluconate, calcium lactate gluconate, or dehydrated whey. The calcium additive may be a mixture of any two or more such additives. In some embodiments, the calcium additive is calcium chloride. In some embodiment, the calcium additive is anhydrous calcium chloride. In one preferred embodiment, the calcium additive is a dehydrated whey.

What constitutes an effective amount of a particular calcium additive will depend on the desired target temperature and the characteristics of that substance, including the proportion of the substance that is calcium. For example, an effective amount of a calcium additive having a proportionally higher calcium content may be less in terms of absolute mass than that of a calcium additive having a proportionally lower calcium content.

The effective amount of a particular calcium additive may be determined empirically by preparing egg patties with varying amounts of the additive, microwaving them for a specified period of time, and measuring their temperatures. Additionally or alternatively, the effective amount may be determined by preparing egg patties with uniform amounts of the calcium additive, microwaving them for varying amounts of time, and measuring their temperatures. Which method is more suitable will depend on the specific objectives of the artisan, such as whether there is a preferred microwaving time or additive amount.

In some embodiments, an effective amount of a calcium additive is from about 0.02 to about 0.15 wt % of the egg patty. In some embodiments, an effective amount of calcium chloride is about 0.03, 0.05, or 0.15 wt % of the egg patty.

Compositions

In one aspect, a composition is provided including whole eggs, egg whites, egg yolks, a fraction thereof or a mixture of any two or more thereof; and a calcium additive, wherein the composition is an egg patty, and the composition exhibits a reduced microwave heating time required to achieve a target temperature, as compared to an egg patty in which the calcium additive is not present. The composition may, optionally, include non-egg ingredients, including but not limited to meats, vegetables, spices, seasonings, dairy products (e.g., milk, cream, whey, buttermilk, cheese, ghee, yogurt, dabber, butter, casein, anhydrous milkfat), oils, flavorings, emulsifiers, or any other ingredient compatible with the preparation and consumption of the egg patty.

The composition may be prepared from any egg variety, such as those produced by birds. Bird varieties include but are not limited to chicken, duck, turkey, quail, goose, ostrich, gull, pheasant, emu, Guinea fowl, pelican, pigeon, partridge, or any wild or domesticated poultry.

The composition may be cooked in the shape of a patty, such as by adding uncooked ingredients to a suitable mold for cooking, or may be formed into the shape of the patty after the ingredients are cooked. Alternatively, the ingredients may be partially cooked and then shaped in to a patty for the completion of cooking. Egg products used in the composition may be cooked in any manner compatible with the preparation of eggs, including but not limited to boiling, frying, poaching, or baking. Egg products used in the composition may be fresh, or maybe preserved by any method compatible with the preservation of eggs, including but not limited to freezing, salting, pickling, and dehydration.

Calcium additives suitable for use in the composition include but are not limited to calcium chloride, calcium caseinate, calcium carbonate, calcium citrate, calcium phosphates, calcium lactate, calcium gluconate, calcium lactate gluconate, or dehydrated whey. In some embodiments of the composition, the calcium additive is calcium chloride. In some embodiments of the composition, the calcium chloride is anhydrous. In some embodiments of the composition, the calcium additive comprises dehydrated whey. In some embodiments, the calcium additive is present from about 0.02 to about 0.15 wt %. In some embodiments, the calcium additive is present at about 0.1 wt %.

Bread products suitable for use with the composition include, but are not limited to, baked goods such as breads, crackers, biscuits, croissants, and the like. Meat products suitable for use with the composition include but are not limited to beef, poultry, pork, or fish products, whether whole or processed. Thus, the egg patty may be assembled into another type comestible. For example, the comestible may be a sandwich that includes a bread product, and optionally one or more meat products, and any of the egg patties as described above.

The present invention, thus generally described, will be understood more readily by reference to the following examples, which are provided by way of illustration and are not intended to be limiting of the present invention.

EXAMPLES

The methods and compositions disclosed herein are further illustrated by the following examples, which should not be construed as limiting in any way.

Example 1: Effects of CaCb on the Heating Time of an Egg Patty

This example demonstrates that egg patties including a calcium additive exhibit reduced microwave heating times to achieve a target temperature compared to egg patties lacking the calcium additive.

Egg patties containing 0 (control), 0.1, 0.2, and 0.4 wt % CaCb were assembled as sandwiches with sausage, cheese, and a croissant and placed at −18° C. until frozen. The frozen sandwiches were wrapped in a paper towel and microwaved with no intervening thaw time. The sandwiches were heated in a 1100 Watt microwave on setting high for 65, 70, or 75 seconds. Sandwiches were held in the microwave for 90 seconds after following heating, to allow component temperatures to equilibrate. The bread top was removed from the sandwich, and the egg patty temperature was measured in the center and at four additional locations across the diameter of the patty.

Figure 2:
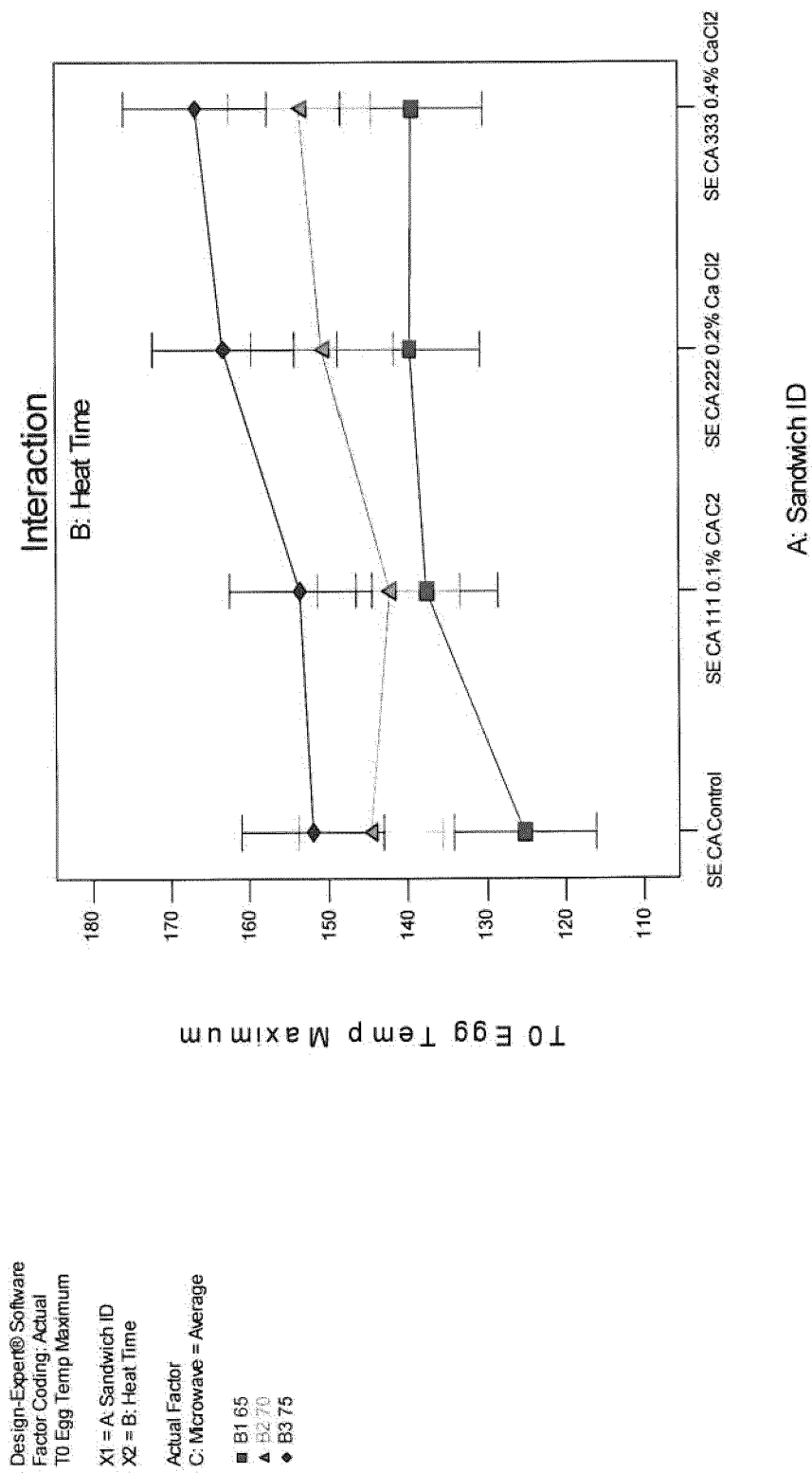
FIG. 2 is a chart showing the effect of 0.1, 0.2, and 0.4 wt % CaCb on the maximum temperature of an egg patty microwave heated for 65 (square), 70 (triangle), or 75 (diamond) seconds at time 0, according to the examples. Time ○ is 90 seconds after microwave heating is completed.
Figure 3:
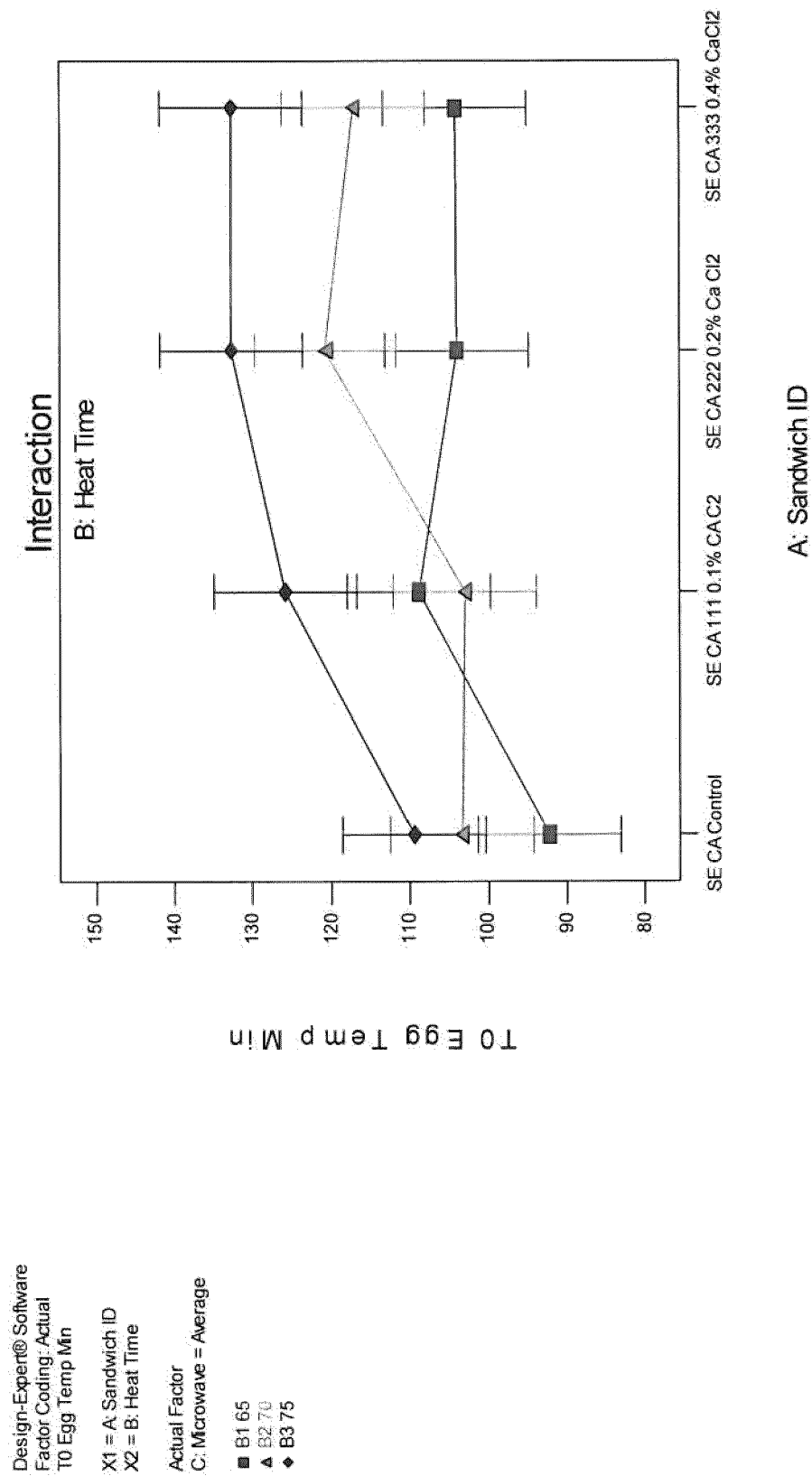
FIG. 3 is a chart showing the effect of 0.1, 0.2, and 0.4 wt % CaCb on the minimum temperature of an egg patty microwave heated for 65 (square), 70 (triangle), or 75 (diamond) seconds at time 0, according to the examples. Time ○ is 90 seconds after microwave heating is completed.
Figure 4:
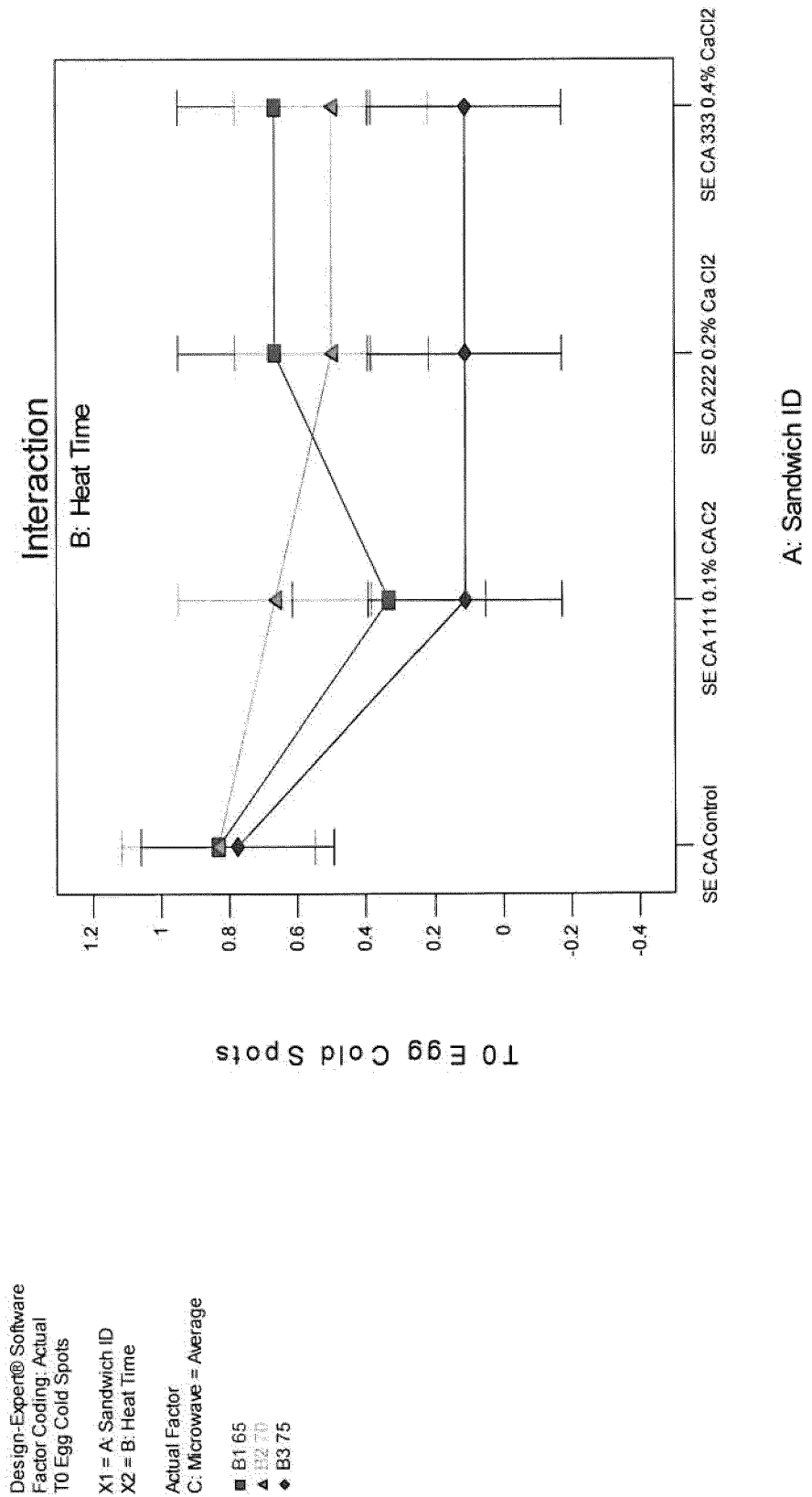
FIG. 4 is a chart showing the effect of 0.1, 0.2, and 0.4 wt % CaCb on the temperature of cold spots in an egg patty microwave heated for 65 (square), 70 (triangle), or 75 (diamond) seconds at time 0, according to the examples. Time ○ is 90 seconds after microwave heating is completed. Cold spots are defined as any surface of the egg patty that was cold to the touch (less than approximately 21° C.).

In general, egg patties containing CaCh displayed higher minimum, maximum, and average temperatures for each heating time than egg patties containing no CaCh (FIGS. 1-3). In addition, egg patties containing CaCh displayed fewer cold spots, which are defined as locations on the egg patty that are cold to the touch (less than approximately 21° C.) (FIG. 4).

These results demonstrate that the inclusion of a calcium additive in an egg patty reduces the heating time required to achieve a target temperature. This shows that the methods and compositions described herein are useful for reducing the heating time of an egg patty, such as would permit single-step microwave heating of a frozen egg patty sandwich without over-heating the non-egg patty components.

EQUIVALENTS

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While several, non-limiting examples have been illustrated and described, it should be understood that changes and modifications can be made therein in accordance with ordinary skill in the art without departing from the invention in its broader aspects as defined in the following claims.

The invention claimed is:

1. A frozen food product comprising:
   egg having a total weight;
   an additive comprising calcium and being combined with the egg, wherein a total weight of the additive is 0.02% to 0.15% of the total weight of the egg such that a first microwave heating time is required to achieve a target temperature of the egg; and
   a bread component,
   wherein the first microwave heating time is less than a second microwave heating time that would be required to achieve the target temperature of the egg if the egg did not include the additive, and
   wherein the bread component would be unpalatable when subject to the second microwave heating time.

2. The frozen food product of claim 1 wherein the bread component achieves a temperature TB1 when subject to the first microwave heating time, and wherein the bread component achieves a temperature TB2 when subject to the second microwave heating time, and wherein a difference between TB1 and the target temperature is less than a difference between TB2 and the target temperature.

3. The frozen food product of claim 1, wherein the egg is formed into a patty.

4. The frozen food product of claim 3, wherein the frozen food product is an egg sandwich.

5. The frozen food product of claim 4, further comprising cheese.

6. The frozen food product of claim 4 further comprising a meat product.

7. The frozen food product of claim 1, wherein the additive includes calcium chloride.

8. The frozen food product of claim 3, wherein the additive is derived from dehydrated whey.

9. The frozen food product of claim 1, wherein the additive is organic.

10. The frozen food product of claim 1, wherein the additive is provided as anhydrous.

11. The frozen food product of claim 1, wherein the additive consists of calcium chloride.

12. The frozen food product of claim 1, wherein the target temperature selected from the group consisting of: average temperature, maximum temperature, and minimum temperature.

13. The frozen food product of claim 12, wherein the egg is formed into a patty and wherein the target temperature is measured at plural locations of the patty.

14. The frozen food product of claim 1, wherein the total weight of the additive is about 0.1% of the total weight of the egg.

15. The frozen food product of claim 1, structurally configured by virtue of the additive and egg combination such that ninety seconds after being microwaved for seventy-five seconds and in a 1100 Watt microwave oven, a target temperature thereof exceeds 48° C. and is less than 71° C.

16. The frozen food product of claim 1, structurally configured by virtue of the additive and egg combination such that ninety seconds after being microwaved for seventy-five seconds and in a 1100 Watt microwave oven, a target temperature thereof is about 60° C.

17. The frozen food product of claim 1, wherein the additive is present at about 0.1 wt % of the egg and was introduced into the egg as anhydrous calcium chloride.

18. The frozen food product of claim 1, wherein the egg is formed into a patty, and wherein the additive decreases the microwave heating time of the egg patty such that an identical egg patty excluding the additive and experiencing identical conditions would exhibit a greater difference between its post-microwaved maximum and minimum temperatures than the egg patty with the additive.

19. The frozen food product of claim 1, wherein the egg comprises a partially cooked egg patty.

20. The frozen food product of claim 1, wherein the egg is an egg patty having a thickness between 0.25 inches and 1 inch, inclusive.

* * * * *